Patented Nov. 30, 1943

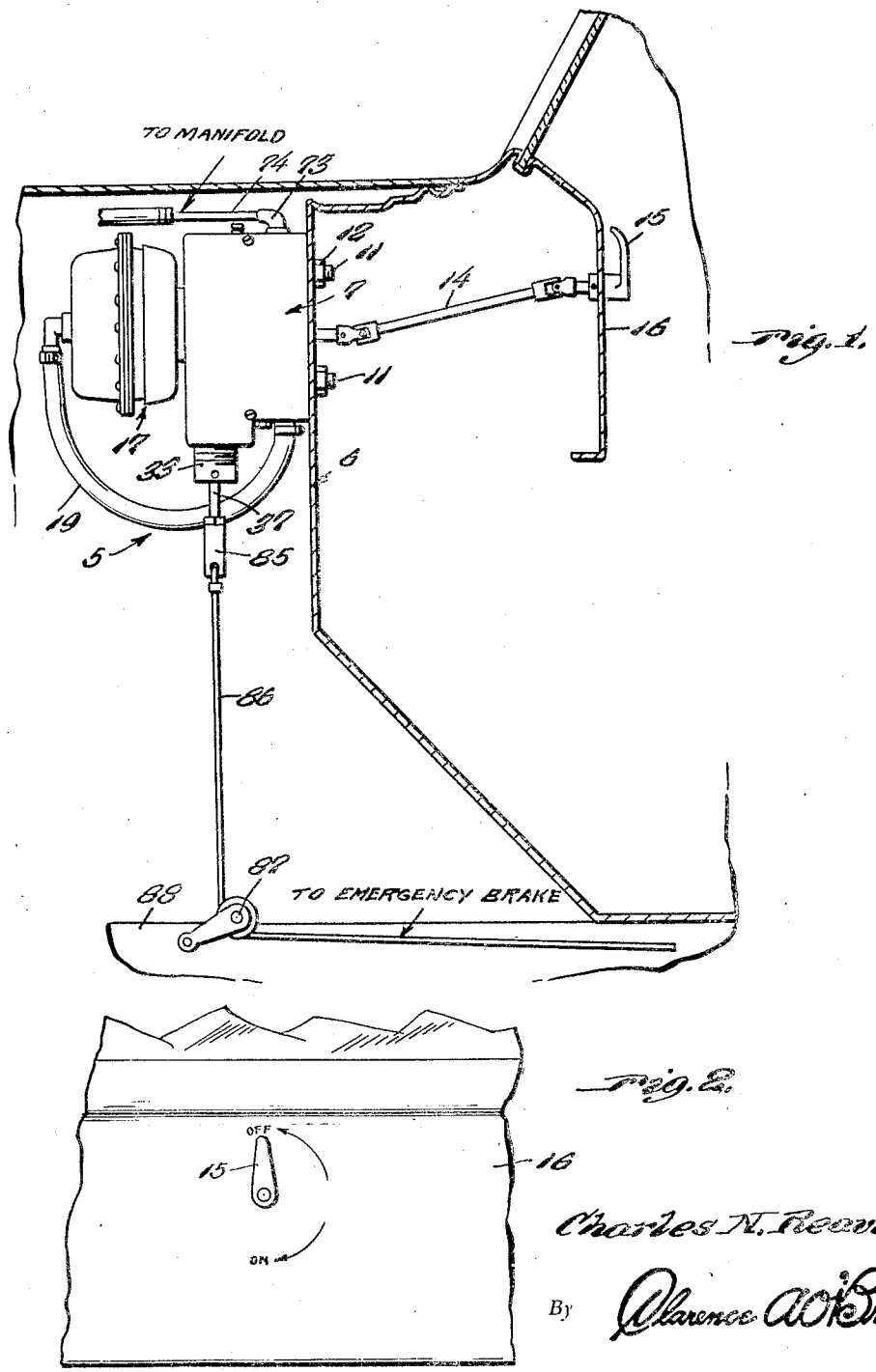

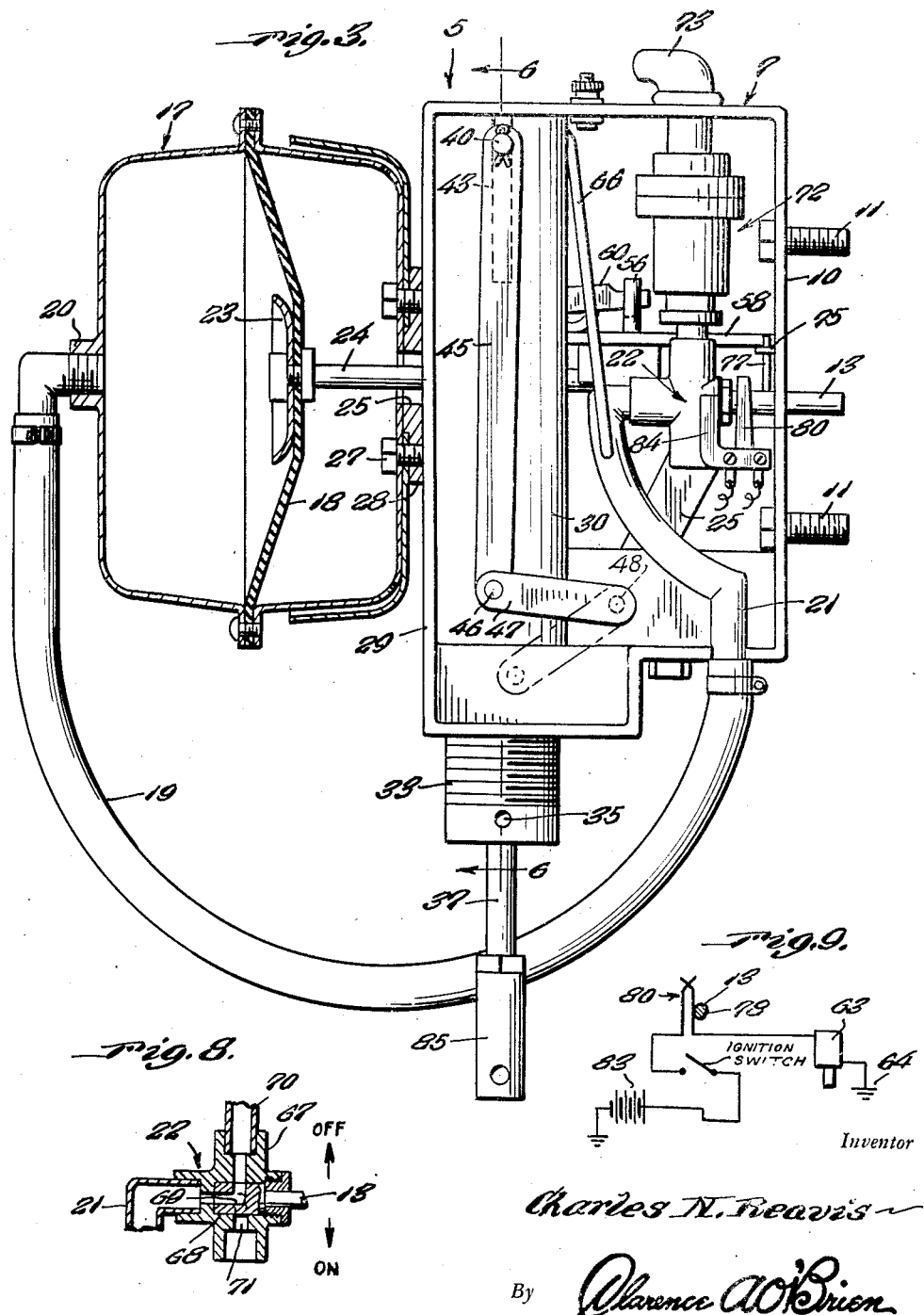

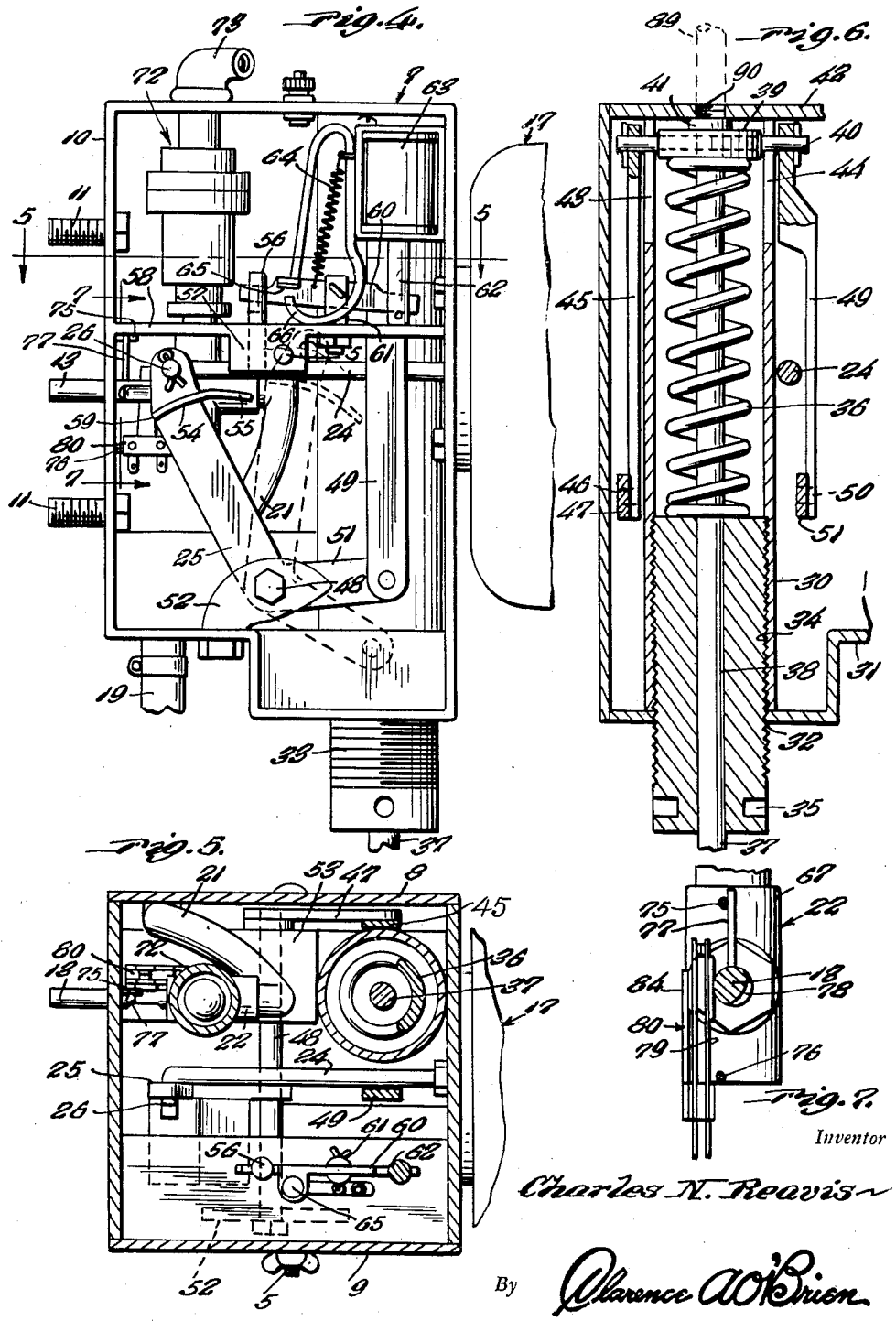

2,335,533

UNITED STATES PATENT OFFICE 2,335,533

EMERGENCY AND PARKING BRAKE OPERATOR

Charles N. Reavis, Raleigh, N. C., assignor of two-thirds to Silas B. Coley, Raleigh, N. C.

Application November 12, 1941, Serial No. 418,785

3 Claims. (Cl. 192—3)

My invention consists in improved means for automatically applying the emergency or parking brake system of a motor vehicle or trailer thereof, while the engine or other source of suction or vacuum is inoperative, and the primary object of my invention is to provide a compact and unified device of this character suitable for easy and inexpensive installation on different makes or types of vehicles, and characterized by positive, gentle, and reliable action.

The subject matter of the present invention constitutes improvements upon the subject matter of my co-pending application, Serial No. 407,362, filed August 15, 1941, and entitled Emergency and parking brakes.

Other important objects of my invention will be apparent from a reading of the following description taken in connection with the drawings, wherein for purposes of illustration I have shown a preferred embodiment of my invention.

In the drawings—

Figure 1 is a general fragmentary vertical longitudinal sectional view taken through the motor compartment and driver's compartment of an automobile and showing an installation in accordance with the present invention.

Figure 2 is a fragmentary enlarged elevational view of the instrument panel showing the manual control switch handle.

Figure 3 is a side elevational view of the unit with one of the covers removed to show interior mechanism, and with the vacuum diaphragm device shown in vertical longitudinal section.

Figure 4 is an elevational view of the opposite side of Figure 3.

Figure 5 is a horizontal sectional view taken through Figure 4 along the line 5—5 and looking downwardly in the direction of the arrows.

Figure 6 is a fragmentary longitudinal sectional view taken through the brake operating spring cylinder and adjacent structure and illustrating in dotted lines the insertion of a bolt or the like for the purpose of releasing the brake while the source of vacuum is inoperative.

Figure 7 is a fragmentary sectional elevational detail of the manual switch.

Figure 8 is a fragmentary transverse vertical sectional view taken through the three-way valve which is operated by the switch handle.

Figure 9 is a schematic wiring diagram showing the electrical connections of the device.

Referring in detail to the drawings, the numeral 5 generally designates the unit as a whole in the form in which it is adapted to be mounted as an entity on the dashboard or bulk head 6 or other supporting medium of the automobile or other vehicle. In the case of installation on an ordinary passenger automobile or truck, the mounting on the dashboard or bulk head 6 places the unit in the motor compartment in which it occupies very little space and presents substantially no obstacle to a clear and unobstructed motor compartment, due to its compact arrangement and relatively small size and the inconspicuous and simple connections which are required to be made to the ignition system and the vacuum manifold or other suitable sources of vacuum operated by the engine while it is running.

The said unit 5 consists of a generally rectangular casing 7 which may conveniently be vertically elongated in form and have removable covers 8 and 9 on one or both sides for access to the interior thereof. The rearward vertical wall 10 of this casing is provided at suitable vertical intervals with bolts 11 which are passed through suitable holes made in the dashboard 6 behind which they are provided with clamping nuts 12 to mount the unit on the dashboard after the fashion of an ordinary hot water or other type of heater such as is commonly used. Also extending through the wall 10 and preferably between the bolts 11 is the rotary shaft 13 which operates both the on and off switch to be described and the three-way valve to be described, the shaft 13 extending rearwardly through the dashboard and being connected by a suitable shaft 14 to the combined switch handle and valve operator 15 which is suitably mounted in the instrument panel 16, the shaft 14 being connected in some suitable flexible manner between the shaft 13 and the handle 15 as shown in Figure 1 of the drawings.

The vacuum diaphragm assembly which is generally designated 17 is of the single acting dry type having an atmospherically suspended diaphragm 18 which is in the position shown in Figure 3 of the drawings when no vacuum is being applied to the forward side thereof through the flexible pipe 19 which is connected in communication with the diaphragm case as indicated by the numeral 20 and has its opposite end connected to the offset pipe 21 which connects with one port of the three-way valve 22.

The diaphragm 18 has a suitable connection of a recognized type such as shown at 23 with the shaft 24 which projects loosely through an opening 25 in the diaphragm housing and has its free end located within the casing 7 and laterally directed as indicated in Figure 5 of the drawings through a hole in one end of the lever 25 and provided with a cotter key or the like retainer to provide the pivotal connection 26 with said lever. The opening 25 in the diaphragm casing provides access for that side of the casing to the atmosphere. Bolts 27 traverse the adjacent side of the diaphragm casing and are threaded through spacers 28 into the forward vertical wall 29 of the unit housing 7 to mount the diaphragm assembly on the unit housing.

The brake applying spring cylinder 30 is mounted to the top and bottom walls of the housing 7 in one corner of the said housing as indicated in Figure 5 of the drawings, the bottom wall 31 of the housing having an opening 32 passing the spring tension adjusting plug 33 which is threaded as indicated at 34 into the lower end of the cylinder 30. The plug is provided with suitable tool receiving means 35 to enable conveniently and accurately turning the plug to adjust the tension of the helical brake applying spring 36 whose lower end it abuts as shown in Figure 6 of the drawings. The said spring is circumposed on a slide shaft 37 which fits in the bore 38 formed in the plug 33 and passes upwardly through the spring 36 and whose upper end is provided with a circular head 39 which slidably fits the smooth interior portion of the cylinder 30, the said head being held in place by a pin 40 which traverses the head and an accommodating opening formed in the shaft 37. An axial boss 41 acts as an abutment to engage the top wall 42 of the unit housing 7 to stop the head 39 short of engagement with this wall. The pin 40 has its ends projecting slidably through longitudinal slots 43 and 44 formed in the side walls of the cylinder 30. One end of the said pin passes through a pivot hole in the adjacent end of a longitudinally arranged link or connecting rod 45 which reaches alongside the cylinder 30 and has its opposite end pivotally connected as indicated by the numeral 46 with the adjacent end of a lever 47 whose fulcrum end is connected by a shaft 48 with the fulcrum end of the lever 25 which has been explained as having its free end connected to the operating shaft 24 of the vacuum diaphragm. As indicated in Figure 3 of the drawings the lever 47 is approximately at right angles with respect to the link or connecting rod 45 in the starting position and is so angulated as to progress toward the dotted line position shown in Figure 3 of the drawings as the brake applying spring is compressed by application of vacuum to the left hand side of the diaphragm 18 in the releasing of the brake. Due to this arrangement of the lever 47 with respect to the connecting rod or link 45 compensation is provided for the required exertion of greater compressive force upon the spring due to its progressively greater resistance to compression which takes place as the brakes are being released.

On the side of the cylinder 30 opposite the link or connecting rod 45 is another link or connecting rod 49 which is pivotally connected on the adjacent end of the pin 40 alongside of the cylinder and has its free end pivotally connected as indicated by the numeral 50 with the free end of the lever 51 which has its fulcrum on the shaft 48, the lever 51 being formed integral with the lever 25 already mentioned. The shaft 48 is suitably supported in a horizontal position across the lower part of the unit housing 7 by suitable flanges and blocks 52 and 53, respectively.

The free end of the lever 25 which is pivotally connected at 26 to the operating shaft 24 of the vacuum diaphragm has spaced inwardly from said end a generally right angularly arranged curvedly deflected boss 54 which presents a curved or angularly deflected face 55 for camming engagement with one end of a longitudinally movable pin 56 which is slidably mounted in a block 57 which is supported by a cross member 58 extending across the housing 7 horizontally as indicated in Figure 4 of the drawings. When the lever 25 is in the position shown in Figure 4 of the drawings and the vacuum is applied to the diaphragm to draw the shaft 24 toward the right, the camming surface 55 will, in the event the pin 56 is projecting below the block 57, push the said pin out of the way in an upward direction; whereas if the lever 25 is in the oppositely angulated position in which it resides while the brakes are in a released condition, the heel 59 of the boss 54 will be located to the right of the pin 56 which will then be projecting downwardly, so that upon release of the vacuum with the brakes in the released condition the lever 25 will engage the heel 59 of the boss 54 with the said pin and be thereby stopped from moving out of the brake applying position toward the brake applied position which is illustrated in full lines in Figure 4 of the drawings, until such time as suitable action is taken to withdraw the pin 56 upwardly and permit the boss 54 to pass the pin. As indicated in various figures of the drawings, the opposite sides of the bottom wall of the housing 7 have bay-windows to allow the levers 51 and 47 to move into and out of their operative positions, without an undue increase in the overall size or weight of the housing 7.

For operating the pin 56 into and out of operative position a yoke 60 is pivoted intermediate its ends on a suitable support 61 secured to the cross member 58, the yoke having one end inserted in a slot in the pin 56 and its opposite end pivotally connected to the outer end of the core 62 which projects from a solenoid coil 63 which is suitably mounted in the upper and forward part of the housing 7 as illustrated in Figure 4 of the drawings. Energization of the solenoid obviously rocks the yoke 60 so as to push the pin 56 downwardly into operative position. To withdraw the pin to the upward inoperative position a spring 64 is stretched between the solenoid mounting and the yoke 60 to the left of its pivotal mounting, so that whenever the solenoid is deenergized the pin 56 will be drawn upwardly out of the way of the lever 25 and its boss 54. The pin 56 is of non-magnetic material so as to be unaffected by any magnetization of the housing 7 or its components by the energization of the solenoid 63.

On the yoke 60 at the same side as the pin 56 is provided a valve 65 which is adapted in the operative position of the pin 56 to engage and close the open end of the slow bleeder pipe 66 which is suitably supported on the solenoid mounting and which leads off from the offset pipe 21 as indicated in Figure 3 of the drawings, the bleeder pipe 66 being of a size to provide for the desired rate of slow bleeding of the vacuum from the left hand side of the vacuum diaphragm as required for the desired gradual but certain application of the emergency brakes of the vehicle following deenergization of the solenoid 63 by the production accidentally or otherwise of an "open" in the ignition system of the engine. When the pin 56 is in the depressed operative position the valve 65 closes the end of the slow bleeder pipe 66.

The longitudinal slot in the pin 56 is proportioned and situated so that while the ignition switch is in the "on" position and the solenoid is energized, the pin 56 can have the necessary freedom to be moved out of locking position by the cam elements 54 and 55 on the lever 25 as said lever moves from the full to the dotted line position, without correspondingly moving the yoke 60 and its valve 65 and opening the bleeder pipe 66, and thereby causing unexpected application of the brakes. The arrangement is such that when the ignition switch is turned off and the solenoid is thereby deenergized, the spring 64 instantly pulls the yoke 60 upwardly and the locking pin 56 is thereby drawn upwardly into inoperative position. This permits the boss 54, 55 on the lever 25 to move from the brake releasing position to the brake applying position shown in full lines in Figure 4 of the drawings. Otherwise the pin 56 stays in the depressed operative position while the ignition switch is "on" to prevent the lever 25 from moving from the dotted line brake releasing position shown in Figure 4 to the brake applying position shown in full lines, even though the diaphragm or the vacuum line thereto should become ruptured.

The three-way valve 22 already mentioned is preferably composed of a T-shaped body 67 fitted with a rotary plug valve 68 which is operatively connected to the switch operating shaft 13 as indicated in Figure 8 of the drawings. The valve 68 has an L-shaped passage 69 therein which in the off position illustrated in Figure 8 has one arm in communication with the valve body branch to which the vacuum source pipe 70 is connected, and its other arm in communication with the vacuum diaphragm casing pipe 21. The valve body has a port 71 open to the atmosphere opposite the pipe 70, and when the valve 68 is turned to the on position this establishes direct communication between the pipe 21 and the atmosphere while cutting off communication between the vacuum source pipe 70 and the pipe 21. The valve 22 is supported by the pipe 21 within the housing 7 as well as by the springless type vacuum check valve 72 to which the pipe 70 is directly connected and which is itself supported through the top wall of the housing 7 as illustrated in Figure 5 of the drawings, and thereabove provided with an adapter 73 for connection with the flexible pipe 74 which leads to the intake or suction manifold of the engine or other suitable source of vacuum operated by the engine.

On the side of the housing 7 are diametrically opposed stop pins 75 and 76 shown in Figure 7 of the drawings which are arranged to limit the swinging movement of an arm 77 on the shaft 13 which is operated by the instrument panel handle 15. The shaft 13 has a cut away portion 78 providing a depression or low point, with the normal contour of the shaft acting as a cam lobe, to operate the flexible member 79 of the switch 80, which as indicated in the wiring diagram of Figure 9 of the drawings is connected between the solenoid 63 which has one side grounded at 64, and the wire 81 which leads to the ignition switch (not shown) which is normally present on the vehicle. A suitable bracket 84 mounts the switch 80 on the valve body 67 as indicated in Figures 3 and 7 of the drawings.

The vertical slide rod 37 which slides through the brake applying spring adjusting plug 33, has on its lower end a suitable connection or coupling 85 to which is connected the brake operating cable or linkage of suitable character which leads to the emergency brake system (not shown). In the arrangement shown in Figure 1 of the drawings the element 86 is a cable trained around a pulley 87 fastened to a chassis member 88, the cable leading rearwardly to connection to the emergency brake applying means (not shown).

In the up or off position of the handle 15 the arm lobe portion of the shaft 13 is applied to the switch 80 so that the switch 80 is closed and the circuit is completed as indicated in Figure 9 of the drawings. In this position of the handle the diaphragm pipe 21 is in communication with the vacuum supply pipe 70 so that the diaphragm 18 is in the left hand position removed from the position shown in Figure 3 of the drawings and in which the brake applying shaft is in a downwardly drawn position and the brakes are released or unapplied, the brake applying spring 36 being in this situation compressed to the limit and ready upon a substantial drop in the vacuum to expand and draw the shaft 37 upwardly and thereby pull on the cable or the like 86 to apply the emergency brakes. This application of the brakes is gradual due to the gradual bleeding action provided by the slow bleeding pipe 66 which is opened to the atmosphere as soon as the solenoid 63 is deenergized due to stopping of the engine and deenergization of the ignition system in consequence.

The slow bleeding operation prevents any sudden stops at either slow or high speed of the automobile or other vehicle so as to prevent damaging and too rapid application of the brakes, especially at high speed.

It will follow from the foregoing that whenever it is desired to park an automobile equipped in accordance with the invention either on a level or on a hill, it is necessary only to slow down the automobile by normal application of the service brakes, if desired, and to then simply turn off the ignition switch. This will effect application of the parking or emergency brake system in a gradual but not undesirably delayed manner, and keep the brakes applied until such time as the ignition key is again turned on and the engine started. Should it become desirable or necessary at any time during which the vehicle is at a standstill and the brakes are in applied condition, to release the brakes, it is only necessary to apply a bolt or the like 89 in the threaded opening 90 in the top wall 42 of the housing 7 in a manner to force the slide shaft 37 in a downward direction thereby sufficiently compressing the brake applying spring 36 by the consequent downward movement of the slide shaft 37 for consequent relaxing of the cable or the like 86.

By turning the handle 15 from the upturned off position to the downturned on position, the switch 80 is opened and the valve plug 68 in the valve 22 is turned to a position in which the vacuum diaphragm pipe 21 is placed in direct exhaust relation to the atmospheric port 71, so that instant bleeding of the vacuum diaphragm assembly is achieved, along with deenergization of the solenoid 63, thereby achieving instant and powerful application of the emergency brake system. With the handle 15 in the downturned "on" position the turning on of the ignition key, such as might take place through accident or through unauthorized tampering by children or others, will not effect release of the brakes, until the handle 15 is restored to the upward or "off" position. Similarly, with the ignition switch locked and the ignition key removed therefrom, movement of the handle 15 to either of its positions will fail to release the brakes. This is a valuable safety feature where the presence of children is involved, since it precludes the possibility of the brakes being released by a child tampering with the handle 15 or other controls.

Although I have shown and described herein a preferred embodiment of my invention, it is to be definitely understood that I do not wish to limit the application of my invention thereto, except as may be required by the scope of the subjoined claims.

Having described the invention, what is claimed as new is:

1. Apparatus for automatically operating the emergency or parking brakes of a vehicle equipped with an engine and a source of vacuum operated thereof, and an essential electrical operating circuit energized only while said engine is running, said apparatus comprising a brake applying spring operatively connected to said brakes, said spring being normally in an expanded condition in which it applies and holds the brakes applied, vacuum operated means normally connected with said source of vacuum, said means being thereby effective to compress said spring and release the brakes, and an electrically operated slow bleeding valve controlled by said circuit, said valve being connected with said means to gradually bleed the same to the atmosphere while said operating circuit is energized and to cause a sufficient diminution of the vacuum upon stopping of the engine by de-energization of said electrical circuit to permit said spring to expand and apply the brakes.

2. Apparatus according to claim 1 wherein positive lock means is operated by said electrically operated valve to engage an active component of said means to lock said element in brake applying condition after operation, to positively prevent unwanted release of the brakes until energization of said circuit, closing of said valve, and restoration of the vacuum source to normal have been produced.

3. An emergency brake operating device for mounting as a unit in the dashboard of an automobile provided with brakes, said automobile having a motor operating a source of suction and an ignition circuit energized only while the motor is running, said device comprising an entity consisting of a housing mountable to the dashboard, a brake applying spring on said housing adapted for connection with the brakes, said spring applying the brakes when expanded and releasing the brakes when compressed, spring compressing and relaxing means on said housing, a vacuum operated diaphragm assembly on said housing including a diaphragm operated element operatively connected to said spring compressing and relaxing means, said diaphragm assembly being connected with said source of suction to compress the brake applying spring in the presence of a normal vacuum existing only while the motor is running and to permit said spring to relax and apply the brakes only during a time of diminished vacuum, an electrically operated slow bleeding valve in said housing, said valve being controlled by said circuit and connected in communication with said diaphragm assembly to slowly bleed the said assembly to the atmosphere to effect gradual application of the brakes whenever said circuit is opened.

CHARLES N. REAVIS.